UNITED STATES PATENT OFFICE.

JOSEPH WILFONG, OF LANCASTER, PENNSYLVANIA, ASSIGNOR OF ONE-HALF TO SAMUEL BOWMAN DILLER, OF SAME PLACE.

LINIMENT.

SPECIFICATION forming part of Letters Patent No. 445,592, dated February 3, 1891.

Application filed March 20, 1890. Serial No. 344,668. (No specimens.)

*To all whom it may concern:*

Be it known that I, JOSEPH WILFONG, of Lancaster, Lancaster county, and State of Pennsylvania, have invented an Improvement in Liniments, of which the following is a specification.

My invention relates to compositions of matter intended for medicinal purposes, the ingredients and proportions of which are fully set forth in the following specification.

More specifically my invention is a medicinal compound designed for external application for the relief and cure of affections of the skin, &c., in both man and beast.

My composition consists of the following ingredients, compounded in substantially the proportions stated:

| | Per cent. |
|---|---|
| Cider vinegar | 26 |
| Litharge | 5 |
| Sweet oil | 31 |
| White lead | 4 |
| Alum | 5 |
| Water | 23 |
| Staff-tree bark (*Celastrus scandens*) | 2 |
| May-apple (*Podophyllum peltatum*) | 2 |
| Nettle (*Urtica dioica*) | 2 |
| Total | 100 |

In preparing the composition the alum, water, and white lead are mixed together and allowed to stand for a considerable period of time to allow the ingredients to thoroughly mix. The cider vinegar and litharge are similarly mixed together in a suitable vessel and allowed to stand for a similar period. These two mixtures are then combined, and the sweet oil is added. The three herbs, staff-tree bark, nettle, and May-apple are then added. If desired, however, these three herbs may be omitted, for while they are desirable in the composition, and lend to the preparation certain medicinal properties, they are not absolutely essential to it.

The herbs may be added in the form of a dried powder or in the form of extracts. The latter preparation is preferable.

The mixture is applied externally in moderate quantities.

While the proportions stated are those which experience has shown are necessary to obtain the best effect, it is apparent that they may be varied to some extent without departing from the principles of my invention.

What I claim as new, and desire to secure by Letters Patent, is—

The herein-described composition of matter to be used as a medicinal compound for external application, consisting of cider vinegar, litharge, sweet oil, white lead, alum, and water, combined in substantially the proportions specified, together with the specified proportions of staff-tree bark, May-apple, and nettle.

In testimony of which invention I have hereunto set my hand.

JOSEPH WILFONG.

Witnesses:
CHAS. E. LONG,
JNO. C. LONG.